Sept. 25, 1962  TAKASHI NAKADA  3,055,271
ELECTRO-MECHANICAL DEVICE
Filed Dec. 11, 1958
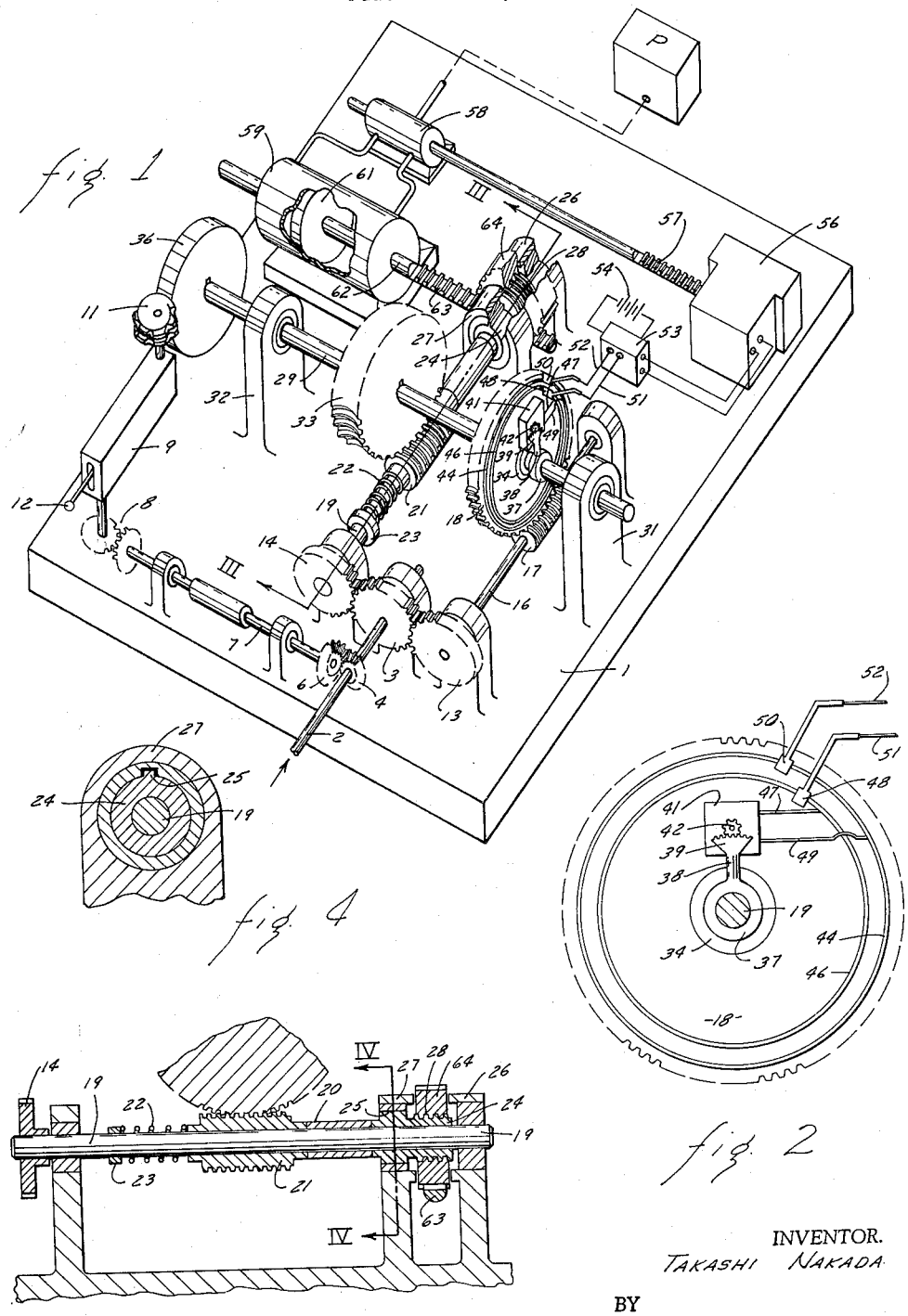
INVENTOR.
TAKASHI NAKADA
BY
Woodhams Blanchard & Flynn
ATTORNEYS United States Patent Office 3,055,271
Patented Sept. 25, 1962

3,055,271
ELECTRO-MECHANICAL DEVICE
Takashi Nakada, 317 Vine St., West Lafayette, Ind.
Filed Dec. 11, 1958, Ser. No. 779,654
4 Claims. (Cl. 90—4)

This invention relates to a gear forming machine and it relates particularly to a device utilizing a master gear of precise construction placed under only a light load for controlling the gear cutting mechanism in a manner to maintain a high degree of accuracy.

In conventional gear forming devices wherein a gear hob is run against a gear blank and the driving relationship between the two includes a worm and worm gear, the accuracy of the finished gear is quite evidently a function, among other things, of the driving worm and worm gear. Inasmuch as the driving of the gear blank and the gear hob involves driving against a substantial load, it is apparent that the worm and worm gear will be subjected to appreciable wear and that, no matter how great the accuracy under which they are originally made, this accuracy will progressively diminish as wear proceeds. Therefore, where gear-forming mechanism of great accuracy is required, a given driving worm and worm gear are necessarily retired from service by reason of their lessening accuracy after only a relatively short period of use. This constitutes an expense in maintenance of equipment which it is desired to minimize.

Accordingly, the objects of the invention are:

(1) To provide gear hobbing mechanism capable of forming gears to an extremely high degree of accuracy.

(2) To provide gear hobbing mechanism, as aforesaid, in which the master or control gear is placed under only a light load in order to minimize the wear to which it is subjected.

(3) To provide gear forming mechanism, as aforesaid, in which the accuracy of the load carrying, or driving, gears does not affect the accuracy of the finished product.

(4) To provide gear forming mechanism, as aforesaid, in which the driving relationship of the load carrying gears is varied according to their deviation from a predetermined standard in such a manner as will compensate for such deviations and the finished gear will be made within a high degree of accuracy.

(5) To provide gear forming mechanism, as aforesaid, in which an extremely accurate master gear is placed under only sufficient load to enable it to drive sensing mechanism which in turn adjusts the driving relationship between the driving gears in such a manner that their deviation from a predetermined standard will be compensated and the finished product will be of extremely high accuracy.

(6) To provide a gear forming mechanism, as aforesaid, in which only one part, namely, the master gear, needs to be formed to an extremely high degree of accuracy whereby the remainder of the mechanism may be made from standard parts and within ordinary machine-shop limits of accuracy.

(7) To provide an apparatus, as aforesaid, which can be constructed relatively simply and out of standard parts so as to minimize initial structural costs as well as to minimize maintenance requirements.

(8) To provide apparatus, as aforesaid, which can be readily adapted and modified to fit a wide variety of gear-forming machines.

Other objects and purposes of the invention will be apparent to persons acquainted with devices of this general type upon a reading of the following description and inspection of the accompanying drawings.

In the drawings:

FIGURE 1 is a schematic, oblique view of a device capable of carrying out the invention.

FIGURE 2 is a fragmentary enlargement of a portion of FIGURE 1.

FIGURE 3 is a section taken on the line III—III of FIGURE 1.

FIGURE 4 is a section taken on the line IV—IV of FIGURE 3.

*General Description*

In general, the invention consists of effecting relative movement of the gear blank and the gear hob through driving gears of only ordinary accuracy, said driving gears in the preferred embodiment including a driving worm and driving worm wheel. Simultaneously, a master worm and worm wheel, which are in general similar to the driving worm and worm wheel above mentioned, but which are of very high accuracy, are utilized to act through suitable control mechanism to adjust the output of the driving gears as needed to modify the speed of output rotation provided thereby to compensate for deviations in said driving worm and worm gear from the master worm and worm wheel.

*Detailed Description*

For convenience in description, certain terminology will be used in the hereinafter following discussion which terminology will be understood as being for reference purposes only and hence having no limiting significance. Particularly, the terms "rightward" and "leftward" and derivatives thereof and words of similar import will be used to indicate directions to the right or left as appearing in the accompanying drawings. Similarly, the terms "upwardly" and "downwardly" and derivatives thereof and words of similar import, will be used to indicate directions taken with respect to one normal operating position which position is that appearing in the drawings; and the terms "inwardly" and "outwardly" and derivatives thereof and words of similar import will be used to indicate directions toward and away from the geometric center of the apparatus or of the part thereof with respect to which said terminology is used.

Referring to the drawing there is indicated a base 1 on which the mechanism is mounted. An input shaft 2 is driven in any convenient manner and supports and drives a spur gear 3 and a bevel gear 4. Said bevel gear 4 drives a further bevel gear 6 which acts through a shaft 7 to drive a pair of bevel gears 8 which in turn operate through a suitable gear box 9 to drive the hob 11. The gear box may be controlled in a conventional manner by a lever 12.

The spur gear 3 simultaneously drives the spur gears 13 and 14. The spur gear 13 is mounted on the shaft 16 and drives the master worm 17 which worm is meshed with a master worm wheel 18. The master worm 17 and worm wheel 18 are both made to extremely high accuracy and constitute the master gears controlling the operation hereinafter described.

The spur gear 14 is mounted on and for rotation with the shaft 19 on which is mounted a driving worm 21. Said driving worm 21 is mounted for rotation with the shaft 19 but is capable of sliding movement along said shaft. A spring 22 located between said worm and a collar 23 urges said worm away from the spur gear 14. The rightward end of the shaft 19 is supported rotatably within the bearing 26. The adjusting member 24 is mounted within the bearing 27 for sliding movement axially with respect thereto but it is held by any convenient means, such as a key and key-way combination 25 (FIGURE 4), against rotation with respect thereto. The shaft 19 passes coaxially through the adjusting member 24 as shown in FIGURE 3 and, preferably, said member 24 together with the support structure 27 functions as a further bearing support for said shaft 19. The leftward end of the adjusting member 24 bears against the rightward end of a spacer 20 which in turn bears against the rightward end of the worm 21. The member 24 has a threaded section 28 intermediate its ends for purposes appearing hereinafter.

A shaft 29 is rotatably supported on the bearings 31 and 32 and carries the driving worm wheel 33 thereon for rotation therewith, said worm wheel 33 being in mesh with the worm 21. Said shaft 29 also supports the master worm wheel 18 thereon but a bearing 34 is provided between worm wheel 18 and the shaft 29 to provide for free rotation of said master worm wheel with respect to said shaft.

The gear ratios are chosen to drive the driving worm wheel 33 and the master worm wheel 18 at any selected rate of rotation with respect to each other which may be convenient in a given device. In the present specific embodiment, the speed of the driving worm wheel is equal to that of the master worm wheel.

A gear blank 36 is supported on the leftward end of the shaft 29 for operation thereon by the hob 11.

A hub 37 is supported on and for rotation with the shaft 29 and supports an arm 38. Said arm 38 supports at its radially outward end an arcuate rack 39.

An electrical circuit modifying device 41, such as a variable capacitor is mounted for rotation on and with the worm wheel 18. Said device has a gear 42 thereon, rotation of which changes the electrical characteristics, such as capacity, controlled by said device. Said pinion 42 is in mesh with the arcuate rack 39 so that angular displacement occurring between the worm wheel 18 and the shaft 29 will result in movement of the rack 39 with respect to the pinion 42 and thereby result in rotation of said pinion and effect a change in the electrical characteristic, such as capacity, controlled by the device 41. A first contact ring 44 is mounted on and for rotation with the worm wheel 18 and is operatively connected to device 41 by a conductor 49. A second contact ring 46 is mounted on the worm wheel 18 and is operatively connected by conductor 47 to the device 41. Take-off contacts 50 and 48 are in operative association with the rings 44 and 46, respectively. Conductors 51 and 52 connect the contacts 48 and 50, respectively, with a suitable amplifier 53 which is powered from any convenient source such as a battery 54. The output of said amplifier 53 is connected to a suitable torque motor 56 which is drivingly associated with a rack 57. Said rack 57 is connected to valve structure 58 and arranged such that the leftward movement of said rack will direct pressure fluid from the source "P" into one end, as the left end, of the power cylinder 59 and movement of the rack 57, rightwardly will direct fluid from said source into the other end, as the rightward end of said cylinder 59. A piston 61 located within said cylinder is connected to a piston rod 62 which has at its rightward end a rack 63. Said rack 63 is associated with gear 64 whose internal bore is threaded for cooperation with the threads 28. Thus, axial movement of the rack 63 rotates the gear 64 and thereby acts through the threads 28 to move the member 24 in an axial direction.

*Operation*

Commencing with rotative power applied to the input shaft 2, it will be seen that the shaft 2 will cause (1) rotation of the hob 11, (2) rotation of the worm 21, worm wheel 33, shaft 29 and thence of the gear blank 36 and, finally, (3) rotation of the spur gear 13, shaft 16, master worm 17 and master worm wheel 18. The hub 37 rotates with the shaft 29 and hence so long as the worm wheel 33 and the worm wheel 18 rotate at identical speeds, there will be no relative movement between the arm 38 and the worm wheel 18.

Assuming now the existence of an irregularity, such as a worn spot, in one of the teeth of the worm wheel 33 such that at the moment it is engaged by the flights of the worm 21, the worm wheel 33 will tend to rotate slightly slower for the angular distance represented by said one tooth than the rate at which it should rotate if it were of accuracy equal to the accuracy of the master worm wheel 18.

In such case, there will be a small angular movement of the arm 38 with respect to the worm wheel 18 which will rotate the pinion 42 and change the electrical condition controlled by the device 41, such as by changing the capacity of the variable capacitor located therein. This changed condition affects in any conventional manner the output of the amplifier 53 and thereby modifies the operation of the torque motor 56. This results in axial movement of the rack 57 in one direction or the other depending upon the direction of relative movement of arm 38 with respect to that of the master worm wheel 18.

Axial movement of the rack 57 moves the core of the valve 58 so as to admit pressure fluid from the source P to one end or the other of the power cylinder 59. This results in movement of the rack 63 longitudinally and effects rotation of the gear 64. This acts through the threads 28 to move the adjusting member 24 axially a distance which is a function of the magnitude of movement of the rack 63 which is itself a function of the relative displacement occurring between the master worm wheel 18 and the shaft 29. Axial movement of the adjusting device 24 results in corresponding axial movement of the worm 21, either by forcing said worm 21 leftwardly against the spring 22 or by moving rightwardly and permitting the spring 22 to cause the worm 21 to move rightwardly to follow the adjusting member 24. The actual speed of rotation of the worm wheel 33 will be maintained substantially exactly equal to that of the master worm wheel 18. This effects rotation of the gear blank 36 at precisely the desired speed in spite of any wearing, or other irregularity, which may occur or exist between the driving worm 21 and the associated worm wheel 33 and the resultant product is correspondingly accurate.

It will be observed that even substantial wear on the worm 21 and the worm wheel 33 will effect only a slight change in angular position of the worm wheel 33, and that thereafter, if the wear is uniform, the rotational relationship between the worm and the worm wheel will remain constant.

Thus, the corrective measures needed involve only slight axial movement of the worm 21 as above described to correct the angular position of the worm wheel 33 and, accordingly, a relatively short rack 39 together with provision for a relatively short longitudinal travel of the worm 21 will be sufficient for carrying out the purposes and objects above set forth and described.

At least some of the principles set forth above with respect to the application of the invention in cutting a gear may may also be applied to the cutting threads in a cylindrical workpiece to form a screw. That is, the cutting of the threads may be accurately controlled to match the thread of the pattern screw by employing a control apparatus in general similar to the apparatus set forth hereinabove. Moreover, the broader principles of the invention can also be applied to other similar operations involving the fabrication of other workpieces according to, or in the form of, a specific pattern, such as the production of a rack, where it is important to avoid or eliminate the errors or inaccuracies of linkage.

While a specific embodiment of the invention has been utilized for illustrative purposes, it will be recognized from the foregoing that the invention may also be expressed in a variety of other specific embodiments and accordingly the hereinafter appended claims will be interpreted to cover such other embodiments unless said claims by their own terms expressly require otherwise.

What is claimed is:

1. Drive mechanism for a gear hobbing machine having a first shaft for driving a gear blank and a second shaft for driving a gear hob, mechanism for driving said first and second shafts at precisely predetermined speeds with respect to each other, comprising in combination: a power input shaft; driving means including a driving worm and a driving worm wheel for transmitting rotative power from said input shaft to one of said first and second shafts and power transmitting means free from driving relationship with said driving worm and said driving worm wheel for transmitting rotative power from said input shaft to the other of said first and second shafts; a master worm and master worm wheel in driving relationship to each other and means free from driving relationship with said driving worm, said driving worm wheel and said power transmitting means for driving said master worm from said power input shaft at a predetermined speed with respect to the speed of rotation of said driving worm but independently thereof whereby said master worm wheel and said driving worm wheel will be urged to normally rotate at a selected rate of rotation with respect to each other but may rotate at different rates; sensing means sensing variations from said selected rate of rotation in the rate of angular movement of said master worm wheel as compared to the rate of angular movement of said driving worm wheel and correcting means responsive to said sensing means for effecting axial movement of said driving worm in response to differences in the rates of angular movement of said master worm wheel and the angular movement of said driving worm wheel to thereby effect an angular movement of said driving worm wheel so that said worm wheels will then rotate at said selected rate, whereby the speed of rotation of said driving worm wheel will maintain said selected rate of rotation with respect to that of said master worm wheel in spite of irregularities in the driving worm and/or the driving worm wheel, said driving and master worms having the same size and pitch characteristics and said driving and master worm wheels having the same size and pitch characteristics so that the driving worm wheel will normally rotate at a speed identical with that of the master worm wheel and said sensing means responds to differences in the rate of angular movement of said master worm wheel and the rate of angular movement of the shaft upon which said driving worm wheel is mounted.

2. Drive mechanism for a gear hobbing machine having a first shaft for driving a gear blank and a second shaft for driving a gear hob, mechanism for driving said first and second shafts at precisely predetermined speeds with respect to each other, comprising in combination: a power input shaft; driving means including a driving worm and a driving worm wheel for transmitting rotative power from said input shaft to one of said first and second shafts and power transmitting means free from driving relationship with said driving worm and said driving worm wheel for transmitting rotative power from said input shaft to the other of said first and second shafts; a master worm and master worm wheel in driving relationship to each other and means free from driving relationship with said driving worm, said driving worm wheel and said power transmitting means for driving said master worm from said power input shaft at a predetermined speed with respect to the speed of rotation of said driving worm but independently thereof whereby said master worm wheel and said driving worm wheel will be urged to normally rotate at a selected rate of rotation with respect to each other but may rotate at different rates; sensing means sensing variations from said selected rate of rotation in the rate of angular movement of said master worm wheel as compared to the rate of angular movement of said driving worm wheel and correcting means responsive to said sensing means for effecting axial movement of said driving worm in response to differences in the rates of angular movement of said master worm wheel and the angular movement of said driving worm wheel to thereby effect an angular movement of said driving worm wheel so that said worm wheels will then rotate at said selected rate, whereby the speed of rotation of said driving worm wheel will maintain said selected rate of rotation with respect to that of said master worm wheel in spite of irregularities in the driving worm and/or the driving worm wheel, said driving and master worm wheels having the same size and shape and the driving and master worms having the same size and shape; and wherein said sensing means includes a movement sensing device having a first portion carried on said master worm wheel and a second portion carried on the same shaft as that which carries said driving worm wheel; whereby differences in angular movement between said last-named shaft and said master worm wheel will result in relative movement between the two parts of said movement sensing device and whereby the output signal of said sensing means is responsive to mechanical movement between the two portions of said movement sensing device.

3. The device defined in claim 2 wherein the driving worm is drivingly mounted on a shaft and is axially slidable therealong; means including a spring urging said worm to a predetermined position on said shaft; an externally toothed member movable axially with respect to the shaft for moving said driving worm axially against the urging of said spring; a gear connected to said toothed member for moving same axially with respect to said shaft in response to rotation of said gear; and means responsive to said sensing means for rotating said gear.

4. The device defined in claim 3 wherein said means for rotating said gear includes a cylinder having a piston movable therein in response to fluid pressure; a piston rod on said piston and extending from said cylinder and having a rack formed thereon which meshes with said gear; and valve means responsive to said sensing means for supplying fluid pressure to said cylinder to cause movement of said piston and said piston rod.

References Cited in the file of this patent

UNITED STATES PATENTS 2,098,132     Buchholz _____ Nov. 2, 1937

FOREIGN PATENTS 865,207     France _____ Feb. 17, 1941